Figure 1:
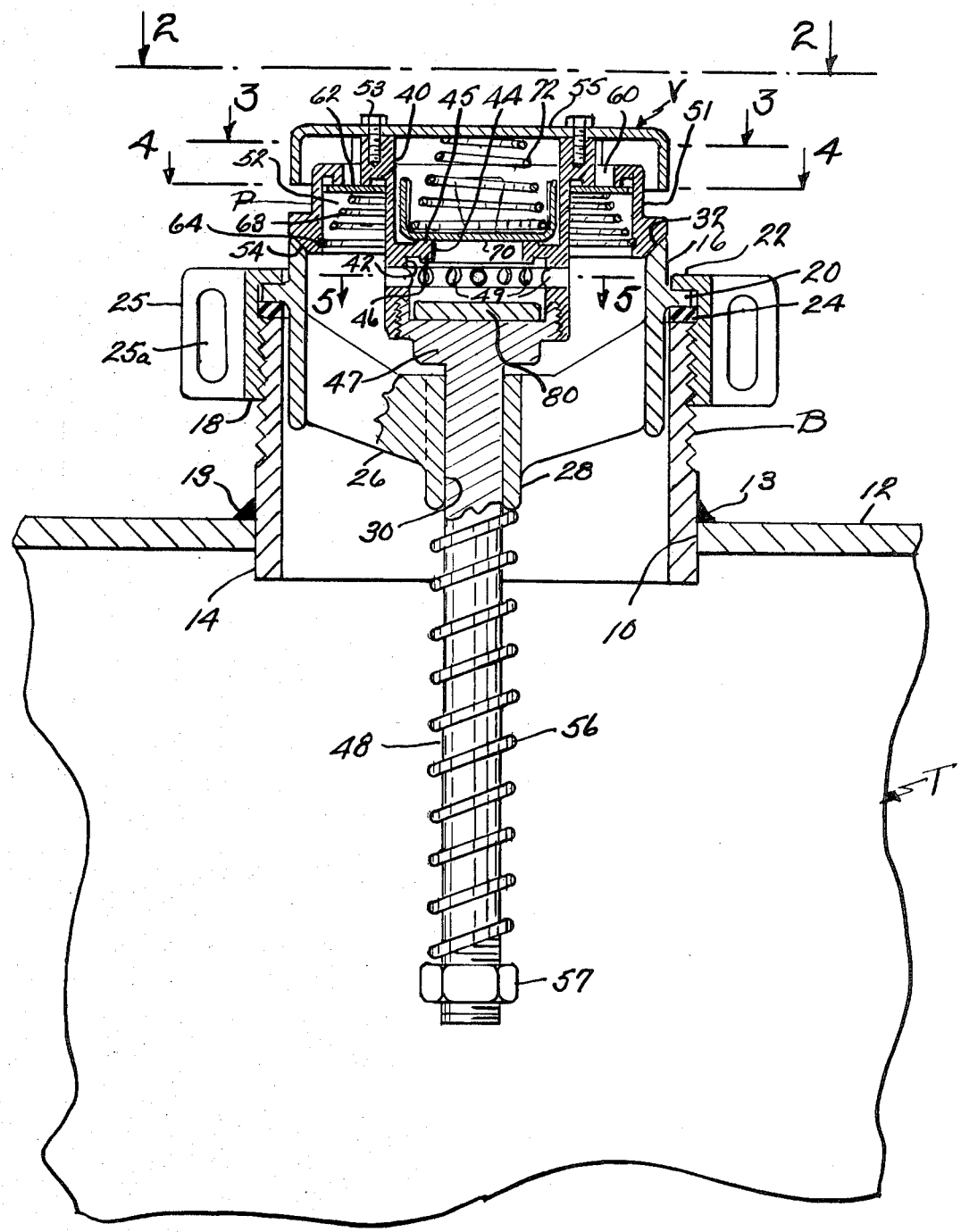

United States Patent

[11] 3,568,695

[72] Inventor Joseph H. DeFrees
Warren, Pa.
[21] Appl. No. 813,961
[22] Filed Apr. 7, 1969
[45] Patented Mar. 9, 1971
[73] Assignee Raymond Vincent Heelan, Jr.
Moorestown, N.J.

[54] FLUID PRESSURE RELIEF VACUUM RELIEF, AND OVERTURN CHECK VALVE
9 Claims, 5 Drawing Figs.
[52] U.S. Cl. .................................................... 137/43,
137/493.6
[51] Int. Cl. ..................................................... F16k 17/18
[50] Field of Search ......................................... 137/493.6,
493.3, 493.1, 43, 512.2, 512.1

[56] References Cited
UNITED STATES PATENTS
| 1,342,985 | 6/1920 | Cash.............................. | 137/493.6X |
| 1,893,942 | 1/1933 | Jensen........................... | 137/493.6X |
| 1,949,639 | 3/1934 | Zimmerer....................... | 137/493.6X |
| 2,732,971 | 1/1956 | Holmes et al. ................. | 137/493.3X |
| 3,304,952 | 2/1967 | Krone............................ | 137/512.2X |

FOREIGN PATENTS
| 125,170 | 6/1949 | Sweden ......................... | 137/493.3 |

Primary Examiner—M. Carey Nelson
Attorney—Baldwin, Egan, Walling & Fetzer

ABSTRACT: A fluid pressure relief valve for a top vent opening in a fluid storage tank including an exhaust safety valve poppet biased to a normally closed position against the vent opening, such poppet being displaceable to an open position when fluids interiorly of the tank exceed a relatively substantial predetermined pressure. The poppet has vacuum vent apertures leading from the tank interior to the tank exterior with a reciprocable vacuum disc disposed on the underside of the poppet and held in a normally closed position against the apertures, such vacuum disc being displaceable inwardly of the tank to open position when fluid pressure interiorly of the tank falls below a predetermined amount. The poppet contains a vertically disposed poppet bore connecting the tank interior with the tank exterior and including a restricted bore portion which forms, at the upper end of the bore, and annular small pressure valve seat. A small pressure valve disc is biased to a normally closed position against such seat, such that the disc is displaceable to an open position when fluids interiorly of the tank exceed a relatively slight predetermined pressure. the restricted bore portion also forms an annular check valve seat disposed within the poppet bore and spaced from the upper end thereof. The valve further includes a free-floating check valve disc disposed within the poppet bore below the check valve seat and of lesser diameter than the poppet bore and is displaceable by gravity within the poppet bore to seat against the check valve to prevent inadvertent escape of fluids from the tank when the tank is at least partially overturned.

INVENTOR.
JOSEPH H. DeFREES

INVENTOR.
JOSEPH H. DE FREES
BY
Baldwin, Egan, Walling & Fetzer
ATTORNEYS

FLUID PRESSURE RELIEF VACUUM RELIEF, AND OVERTURN CHECK VALVE

This invention relates to valves and more particularly to fluid pressure relief valves used in connection with tanks or containers for storage or transportation of fluids.

There has long been a need for a versatile, efficient, and highly effective fluid tank relief or vent valve. In valves used on tanks for flammable liquids, the demands are particularly stringent. In accordance with the U.S. Department of Transportation requirements, such valve must have many requisites including:

a. Normal outbreathing (exhaust) due to expansion, evaporation, and sealed loading of the tank;
b. Normal inbreathing (vacuum) due to contraction, condensation, and discharge of lading;
c. Emergency outbreathing (exhaust) due to, for example, fire exposure; and
d. Means for checking the discharge of lading (through the valve) due to overturn of the tank.

Accordingly, it is an object of the invention to produce a vent valve providing inbreathing, normal and emergency outbreathing, and means for checking the discharge of lading due to overturn of the tank.

A further object of the invention is to provide a valve of the above type that is simple in construction, inexpensive to manufacture, and highly effective in operation.

Briefly, the foregoing objects are accomplished by the provision of a fluid pressure relief valve for a top vent opening in a fluid storage tank including an exhaust safety valve poppet disposed exteriorly of the tank and reciprocable to and from the opening to selectively seal the same, with poppet bias means for retaining the poppet in a normally closed position against the opening. The poppet is displaceable to an open position for emergency outbreathing when fluids interiorly of the tank exceed a relatively substantial predetermined pressure which may occur, for example, due to fire exposure.

The poppet has vacuum vent apertures leading from the tank interior to the tank exterior, with a vacuum disc disposed on the underside of the poppet and reciprocable to and from the apertures to selectively seal the same. Vacuum disc bias means are provided for retaining the vacuum disc in a normally closed position against such apertures, the vacuum disc being displaceable inwardly of the tank to open position when fluids interiorly of the tank fall below a predetermined pressure due to contraction, condensation or discharge of lading.

The poppet also contains a vertically disposed poppet bore connecting the tank interior with the tank exterior, such bore having a restricted portion forming at the upper end of the bore an annular small-pressure valve seat. A small-pressure valve disc, reciprocable to and from the small-pressure valve seat, is provided along with a small-pressure valve disc bias means for retaining the small-pressure valve disc in a normally closed position against the small-pressure valve seat. The small-pressure valve disc is displaceable to an open position when fluids interiorly of the tank exceed a relatively slight predetermined pressure due, for example, to expansion, evaporation, and sealed loading of the tank.

The restricted portion of the bore also forms an annular check valve seat disposed within the poppet bore and spaced from the upper end thereof. A free-floating check valve disc is disposed within the poppet bore, below the check valve seat, and is of lesser diameter than the poppet bore, such check valve disc being displaceable by gravity within the poppet bore to seat against the check valve seat when the tank is at least partially overturned to check outward flow of stored lading due to partial or complete overturn of the tank. The poppet valve has a weather hood or dust cover secured to the upper end thereof to prevent entry of dust and weather elements into the valve.

Thus, in a single vent valve, there is provided inbreathing, low and high pressure outbreathing, and automatic check valve means to check outward flow of liquid due to tank overturn.

Figure 2:
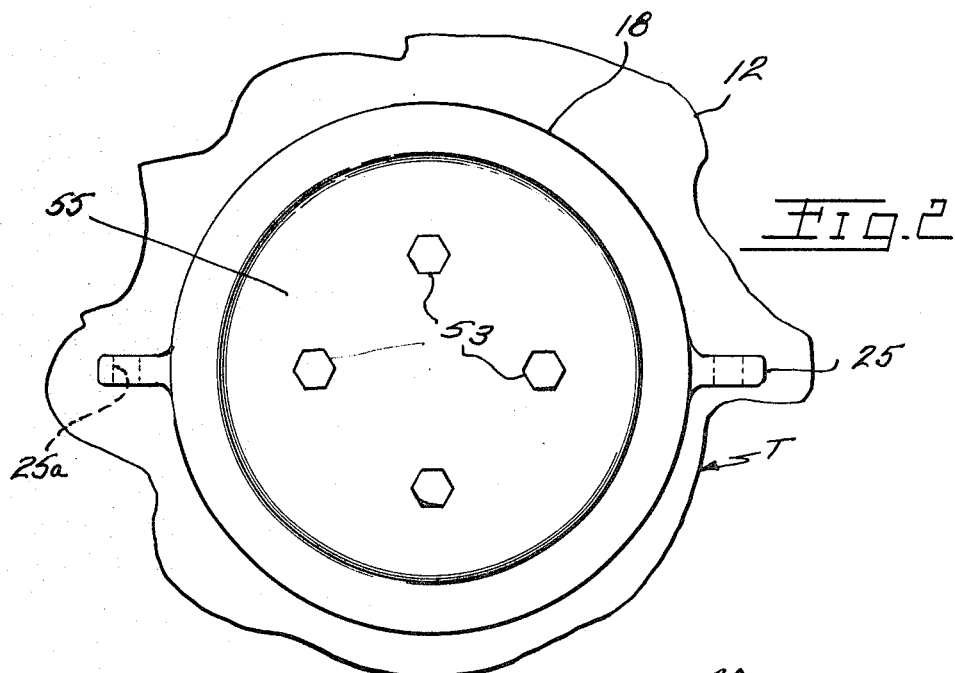
Figures 3, 4:
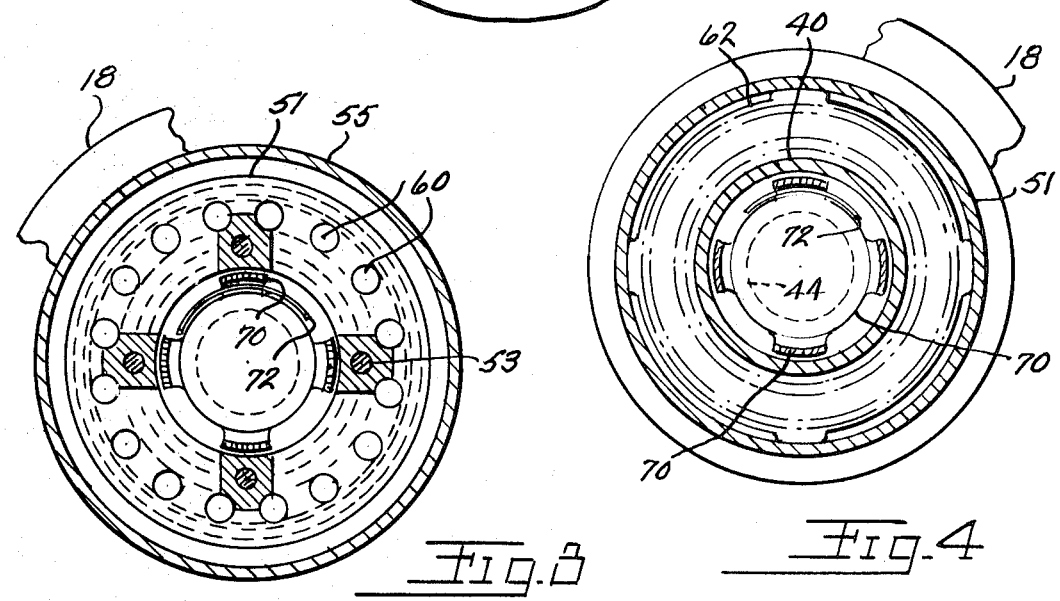
Figure 5:
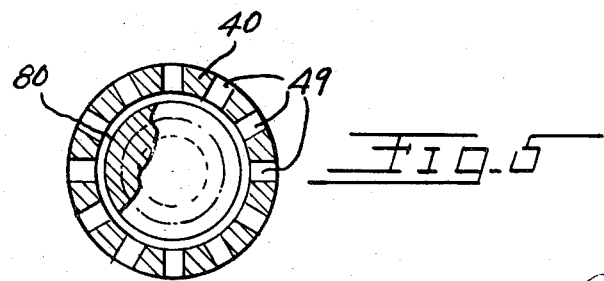

Other objects and advantages of the invention will be apparent from the following description taken in conjunction with the drawings wherein:

FIG. 1 is a vertical sectional view of a vent valve constructed in accordance with the invention;
FIG. 2 is a top view of the valve taken along the line 2—2 of FIG. 1;
FIG. 3 is a sectional view taken along the line 3—3 of FIG. 1;
FIG. 4 is a view taken along the line 4—4 of FIG. 1; and
FIG. 5 is a view taken along the line 5—5 of FIG. 1.

Although the valve of the invention is shown and described herein with reference to vent or relief valves applied to fluid storage and transportation tanks, it will be understood that it may be applied to any type of fluid container.

The terms and expressions which are employed herein are used as terms of description, and not of limitation, and there is no intention, in the use of such terms and expressions, of excluding any equivalents of the features shown or described, or portions thereof, but it is recognized that various modifications are possible within the scope of the invention claimed.

Referring to the drawings, there is shown a tank fluid pressure vent or relief valve of the invention, generally designated as V, mounted in the opening 10 formed in the top wall 12 of a fluid storage tank T. The valve includes as main components a base B, and an exhaust safety valve poppet P disposed substantially exteriorly of the tank.

The base B includes an annular upstanding pipe member 14 positioned in the tank opening 1 of the tank top wall 12 and welded to such wall as at 13, an annular tubular valve body 16 disposed on and secured to the pipe 14, and a collar 18 threaded onto the pipe 14 and thus securing the body 16 to the pipe member 14 via the coacting overlapping flanges 20 and 22 on the body and collar respectively. A gasket 24 may be interposed between the body 17 and pipe 14 to form a fluid seal therebetween. The lugs 25 are provided as an aid in tightening the collar 18, and the lug openings 25a provide means for attaching seal tags. Thus, the valve V may be very quickly removed from the tank T for cleaning and repair purposes simply by unscrewing the collar 18.

The valve body 16 includes a plurality of radial support arms 26 extending radially inwardly from the body, said valve body further including a central, vertically disposed stem guide sleeve 28 secured to the inner ends of the arms 26. The sleeve 28 contains a vertical, centrally disposed, longitudinal, guide sleeve bore 30.

The valve body 16 has an annular opening or valve seat 32 formed on the upper edge thereof forming the top vent opening of the valve V.

The poppet P includes an annular, centrally disposed, hollow poppet body or upstanding cylindrical wall 40 containing a vertical poppet bore 42 connecting the tank interior with the tank exterior, such bore 42 having a restricted bore portion 44 forming, at the upper end of such restricted bore portion, an annular small-pressure valve seat 45, and at the lower end of such restricted bore portion an annular check valve seat 46. The bore 42 is closed at its lower end by the bottom wall 47. However, communication or flow passage from the tank interior to the tank exterior is provided via the plurality of circumferentially disposed radial apertures 49 formed in the cylindrical body or wall 40 below the restricted portion 44 of the bore 42.

The poppet body 40 also has a poppet stem 48 threaded or otherwise secured thereto and extending downwardly from the center of the poppet body and reciprocably disposed in the guide sleeve bore 30, whereby the poppet P is reciprocable to and from the valve seat or vent opening 32 to selectively seal the same in a manner now to be described.

The poppet body 40 includes an annular, outwardly and thence downwardly extending tapered collar or flange portion 51 spaced from and encircling the upper portion of the poppet body 40 to form an annular cavity 52 therebetween, said cavity being open ended at its lower end in communication with the tank interior. The flange portion 51 has a lower peripheral tapered edge 54 engageable with the vent opening or valve seat 32 to selectively seal the same.

Secured to the top side of the poppet P by any suitable means, such as the bolts 53, is a dust cover or hood 55, which is spaced from and covers the entire valve V to keep dirt, dust and weather elements therefrom.

A poppet bias means is provided for retaining the poppet P in a normally closed position against the vent opening or valve seat 32, such bias means, in the preferred form, comprising a stem coil spring 56 encircling the stem 48, such spring being compressed between the stem guide sleeve 28 and the outwardly extending spring retaining nut 57 which is threaded onto the bottom end of the stem 48. The stem coil spring 56 has a bias strong enough to overcome a predetermined gravity head pressure applied against the fluid pressure relief valve V (or poppet P) by fluids interiorly of the tank when the tank is overturned.

In operation, when fluids in the tank T exceed a predetermined pressure, such pressurized fluids act against the underside of the poppet P and lift the poppet off of its seat or vent opening 32 thereby venting such pressurized fluids to the tank exterior. It will be understood that the poppet spring 56 is designed to keep the poppet P in normally close position until fluids interiorly of the tank exceed a substantial predetermined pressure, such predetermined pressure being more than the normal pressure employed to pressure unload the tank. Thus, the poppet P effects emergency outbreathing (exhaust) due, for example, to fire exposure.

A vacuum vent aperture means leading from the tank interior to the tank exterior is provided in the poppet P in the form of a plurality of apertures 60, such apertures being disposed circumferentially in the poppet flange portion 51. The apertures 60 form a means of communication between the cavity 52 (and thus the tank interior) and the exterior of the tank. The vacuum vent aperture means also includes a vacuum disc 62 positioned on the underside of the poppet flange portion 51 and reciprocable to and from the apertures 60 to selectively seal the same. To retain the disc 62 in a normally closed position against the apertures 60, a disc bias means is provided in the form of a tapered coil spring 63 positioned at its lower end in an annular groove 64 formed in the lower portion of the inner surface of the flange portion 51, and with the upper end of the spring abutting the disc 62.

In operation, when fluids interiorly of the tank T fall below a predetermined pressure, as may happen if pressurizing air fails, (or a tank vacuum is created due to contraction, condensation or discharge of lading), atmospheric pressure exteriorly of the tank forces the disc 62 downwardly or inwardly against the action of the spring 63 thereby opening the apertures 60 to relieve the vacuum interiorly of the tank. Thus, protection against collapse of the tank T is provided. With pressure unloading, should the product discharge rate exceed the rate air is admitted to the tank T (because of inadvertent failure to open valves, etc.) the partial vacuum is relieved by admission of air through the vacuum apertures 60 as above described.

The valve V also contains means for providing normal outbreathing (exhaust) in the form of a small pressure valve disc 70 reciprocable to and from the small-pressure valve seat 45. Small-pressure valve disc bias means is provided in the form of the coil spring 72 for retaining the disc 70 in a normally closed position against the seat 45. In operation, the small-pressure disc 70 is displaceable to an open position off of the seat 45 against the bias action of the spring 72 when fluids interiorly of the tank T exceed a relatively slight predetermined pressure such as may be caused by expansion, evaporation, or sealed loading of the tank.

The invention also provided means for checking the outward flow of stored fluids due to overturn of the tank T in the form of a check valve disc 80 disposed within the poppet bore 42 below the check valve seat 46. The disc 80 is of lesser diameter than the poppet bore 42 and is displaceable within such bore to seat against the check valve seat 46 when the tank T is partially or completely overturned. Specifically, the check valve disc 80 is free floating within the poppet bore 42 and is displaceable by gravity to seat against the check valve seat 46 to prevent fluid flow through the poppet bore 42 and past the small-pressure valve seat 45 when the tank is at least partially overturned.

Thus, there is provided a versatile, efficient and highly effective fluid pressure vent or relief valve furnishing normal (low-pressure) outbreathing, emergency (high-pressure) outbreathing, normal inbreathing (exhaust), and check flow of stored fluid due to overturn of the tank, all as required by the U.S. Department of Transportation regulations.

It is to be understood that the poppet P is provided for emergency (high-pressure) venting such as, for example, in case of fire as opposed to valve disc 70 which operated at much lower pressures and is designed to compensate for evaporation, expansion, and inflow of product.

I claim:

1. A fluid pressure relief valve for a top vent opening in a fluid storage tank including, an exhaust safety valve poppet disposed exteriorly of the tank and reciprocable to and from said opening to selectively seal the same, poppet bias means for retaining said poppet in a normally closed position against said opening, said poppet being displaceable to an open position when fluids interiorly of the tank exceed a relatively substantial predetermined pressure, said poppet having a vacuum vent aperture means leading from the tank interior to the tank exterior, a vacuum disc disposed on the underside of the poppet and reciprocable to and from said aperture means to selectively seal the same, vacuum disc bias means for retaining said vacuum disc in a normally closed position against said aperture means, said vacuum disc being displaceable inwardly of the tank to open position when fluids interiorly of the tank fall below a predetermine pressure, said poppet containing a vertical poppet bore connecting the tank interior with the tank exterior and having a restricted bore portion forming at the upper end of such restricted bore portion an annular small-pressure valve seat, a small-pressure valve disc reciprocable to and from the small-pressure valve seat, and small-pressure valve disc bias means for retaining the small-pressure valve disc in a normally closed position against the small-pressure valve seat, said small-pressure valve disc being displaceable to an open position when fluids interiorly of the tank exceed a relatively slight predetermined pressure said restricted bore portion also forming an annular check valve seat disposed within the poppet bore and spaced from the upper end thereof, said valve further including a check valve disc disposed within the poppet bore below the check valve seat and of lesser diameter than the poppet bore and displaceable within the poppet bore to seat against the check valve seat when the tank is at least partially overturned.

2. The structure of claim 1 wherein said check valve disc is free floating within the poppet bore and is displaceable by gravity to seat against the check valve seat to prevent fluid flow through the poppet bore and past the small-pressure valve seat when the tank is at least partially overturned.

3. The structure of claim 1 wherein the vent opening is formed by an upstanding pipe member disposed in the top wall of the fluid storage tank, said valve further including a tubular valve body secured to the top of said pipe member, said valve body having an annular valve seat at the top end thereof forming the vent opening, said valve body having a plurality of support arms extending radially inwardly from the body, said valve body further including a vertically disposed stem guide sleeve secured to the inner end of said arms, said stem guide sleeve having a vertical centrally disposed longitudinal guide sleeve bore, said poppet including a centrally disposed hollow tubular poppet body containing said poppet bore, said poppet bore being closed at its lower end, said tubular poppet body including an annular outwardly and downwardly extending flange portion having a tapered edge on the lower peripheral free end thereof engageable with the vent opening, said tubular poppet body also having a poppet stem extending downwardly from the lower end of the poppet body, said stem being reciprocably disposed in said guide sleeve bore whereby the poppet is reciprocable to and from said vent opening to selectively seal the same.

4. The structure of claim 3 wherein said tubular poppet body includes an upstanding cylindrical wall having a plurality of circumferentially disposed radial apertures therein positioned below the restricted portion of the bore, said apertures forming a passage way from the tank interior to the poppet bore for effecting predetermined fluid flow therethrough.

5. The structure of claim 3 wherein said poppet body has a dust hood secured to the upper side thereof, said hood being spaced from and covering the entire valve to keep dust therefrom.

6. The structure of claim 5 wherein said small-pressure valve disc bias means includes a coil spring compressed between said dust cover and said small-pressure valve disc.

7. The structure of claim 3 wherein said poppet stem has an outwardly extending annular spring retaining nut on the lower end thereof, and said poppet bias means includes a stem coil spring encircling said stem and compressed between said stem guide sleeve and said nut.

8. The structure of claim 7 wherein said stem coil spring has a bias strong enough to overcome a predetermine gravity head pressure applied against the fluid pressure relief valve by fluids interiorly of the tank when the tank is at least partially overturned.

9. A fluid pressure relief valve for a top vent opening in a fluid storage tank including, an exhaust safety valve poppet disposed exteriorly of the tank and reciprocable to and from said opening to selectively seal the same, poppet bias means for retaining said poppet in a normally closed position against said opening, said poppet being displaceable to an open position when fluids interiorly of the tank exceed a relatively substantial predetermined pressure, said poppet having a vacuum vent aperture means leading from the tank interior to the tank exterior, a vacuum disc disposed on the underside of the poppet and reciprocable to and from said aperture means to selectively seal the same, vacuum disc bias means for retaining said vacuum disc in a normally closed position against said aperture means, said vacuum disc being displaceable inwardly of the tank to open position when fluids interiorly of the tank fall below a predetermine pressure, said poppet containing a vertical poppet bore connecting the tank interior with the tank exterior and having a restricted portion forming at the upper end of the bore an annular small-pressure valve seat, a small-pressure valve disc reciprocable to and from the small-pressure valve seat, small-pressure valve disc bias means for retaining the small-pressure valve disc in a normally closed position against the small-pressure valve seat, said small-pressure valve disc being displaceable to an open position when fluids interiorly of the tank exceed a relatively slight predetermined pressure, said restricted portion also forming an annular check valve seat disposed within the poppet bore and spaced from the upper end thereof, said valve further including a check valve disc disposed within the poppet bore below the check valve seat and of lesser diameter than the poppet bore and displaceable within the poppet bore to seat against the check valve seat when the tank is at least partially overturned, said check valve disc being free floating within the poppet bore and being displaceable by gravity to seat against the check valve seat to prevent fluid flow through the poppet bore and past the small pressure valve seat when the tank is at least partially overturned, said vent opening being formed by an upstanding pipe member disposed in the top wall of the fluid storage tank, said valve further including a tubular valve body secured to the top of said pipe member, said valve body having an annular valve seat at the top end thereof forming the vent opening, said valve body having a plurality of support arms extending radially inwardly from the body, said valve body further including a vertically disposed stem guide sleeve secured to the inner end of said arms, said stem guide sleeve having a vertical centrally disposed longitudinal guide bore, said poppet including a centrally disposed hollow tubular poppet body containing said poppet bore, said poppet bore being closed at its lower end, said tubular poppet body including an annular outwardly and downwardly extending flange portion having a tapered edge on the lower peripheral free end thereof engageable with the vent opening, said tubular poppet body also having a poppet stem extending downwardly from the lower end of the poppet body, said stem being reciprocably disposed in said guide sleeve bore whereby the poppet is reciprocable to and from said vent opening to selectively seal the same, said tubular poppet body including an upstanding cylindrical wall having a plurality of circumferentially disposed radial apertures therein positioned below the restricted portion of the bore, said apertures forming a passageway from the tank interior to the poppet bore for effecting predetermined fluid flow therethrough, said poppet body having a dust hood secured to the upper side thereof, said hood being spaced from and covering the entire valve to keep dust therefrom, said small-pressure valve disc bias means including a coil spring compressed between said dust cover and said small-pressure valve disc, said poppet stem having an outwardly extending spring retaining nut on the lower end thereof, said poppet bias means including a stem coil spring encircling said stem and compressed between said stem guide sleeve and said nut, said stem coil spring having a bias strong enough to overcome a predetermined gravity head pressure applied against the fluid pressure relief valve by fluids interiorly of the tank when the tank is overturned.